(12) United States Patent
Shi et al.

(10) Patent No.: US 12,436,636 B2
(45) Date of Patent: Oct. 7, 2025

(54) TOUCH PANEL AND DISPLAY DEVICE

(71) Applicant: BOE Technology Group Co., Ltd., Beijing (CN)

(72) Inventors: Shiming Shi, Beijing (CN); Zewen Bo, Beijing (CN); Libin Liu, Beijing (CN); Song Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/698,002

(22) PCT Filed: Jul. 13, 2023

(86) PCT No.: PCT/CN2023/107331
§ 371 (c)(1),
(2) Date: Apr. 2, 2024

(87) PCT Pub. No.: WO2024/022126
PCT Pub. Date: Feb. 1, 2024

(65) Prior Publication Data
US 2024/0427444 A1  Dec. 26, 2024

(30) Foreign Application Priority Data
Jul. 26, 2022 (CN) .......................... 202210883721.6

(51) Int. Cl.
*G06F 3/041* (2006.01)
*G06F 3/044* (2006.01)

(52) U.S. Cl.
CPC .......... *G06F 3/0412* (2013.01); *G06F 3/0445* (2019.05); *G06F 3/041* (2013.01);
(Continued)

(58) Field of Classification Search
CPC ................ G06F 3/0412; G06F 3/0445; G06F 2203/04103; G06F 2203/04112; G06F 3/041; G06F 3/0443
See application file for complete search history.

(56) References Cited

U.S. PATENT DOCUMENTS

2019/0302959 A1* 10/2019 Clark .................... G06F 3/0412
2020/0201483 A1    6/2020 Feng
(Continued)

FOREIGN PATENT DOCUMENTS

| CN | 212515739 U | 2/2021 |
| CN | 112433414 A | 3/2021 |

(Continued)

OTHER PUBLICATIONS

PCT/CN2023/107331 international search report dated Nov. 3, 2023.
(Continued)

*Primary Examiner* — Douglas Wilson
(74) *Attorney, Agent, or Firm* — IPro, PLLC

(57) ABSTRACT

The present disclosure provides a touch panel and a display device. The touch panel includes a touch display region and a peripheral region surrounding the touch display region. The touch panel includes: a substrate; a light emitting unit on a side of the substrate and in the touch display region; a first inorganic packaging layer on a side of the light emitting unit away from the substrate; a shielding structure on a side of the first inorganic packaging layer away from the substrate and located in the touch display region; a first organic packaging layer on a side of the shielding structure away from the substrate; a second inorganic packaging layer on a side of the first organic packaging layer away from the substrate; and a touch electrode on a side of the second
(Continued)

inorganic packaging layer away from the light emitting unit and in the touch display region.

20 Claims, 6 Drawing Sheets

(52) U.S. Cl.
CPC .. *G06F 3/0443* (2019.05); *G06F 2203/04103* (2013.01); *G06F 2203/04112* (2013.01)

(56) References Cited

U.S. PATENT DOCUMENTS

| | | | |
|---|---|---|---|
| 2023/0004253 A1* | 1/2023 | Shin | G06F 3/0446 |
| 2025/0021198 A1* | 1/2025 | Son | G06F 3/0412 |

FOREIGN PATENT DOCUMENTS

| | | | |
|---|---|---|---|
| CN | 113078195 A | | 7/2021 |
| CN | 214586837 U | * | 11/2021 |
| CN | 114115614 A | | 3/2022 |
| CN | 115167709 A | | 10/2022 |
| WO | 2021213210 A1 | | 10/2021 |

OTHER PUBLICATIONS

PCT/CN2023/107331 Written Opinion dated Nov. 3, 2023.
CN 202210883721.6 first office action dated Jun. 24, 2025.

* cited by examiner

TOUCH PANEL AND DISPLAY DEVICE

CROSS-REFERENCE TO RELATED APPLICATIONS

This application is a national stage of international PCT Application No. PCT/CN2023/107331 filed on Jul. 13, 2023, the entire contents of which are incorporated herein by reference.

TECHNICAL FIELD

The present disclosure relates to the field of display technologies, and in particular, to a touch panel and a display device.

BACKGROUND

Touch technologies mainly include a resistive type touch technology, a capacitive type touch technology, and an infrared optical type touch technology. The capacitive type touch technology has a characteristic of sensitive response, and is widely applied to smart phones and tablet computers. Existing touch panels have a poor touch effect.

SUMMARY

An object of the present disclosure is to provide a touch panel and a display device that can improve a touch effect.

According to an aspect of the present disclosure, there is provided a touch panel, including: a touch display region and a peripheral region surrounding the touch display region, where the touch panel includes:
a substrate;
a light emitting unit on a side of the substrate and in the touch display region;
a first inorganic packaging layer on a side of the light emitting unit facing away from the substrate;
a shielding structure on a side of the first inorganic packaging layer facing away from the substrate and in the touch display region;
a first organic packaging layer on a side of the shielding structure facing away from the substrate;
a second inorganic packaging layer on a side of the first organic packaging layer facing away from the substrate;
a touch electrode on a side of the second inorganic packaging layer facing away from the light emitting unit and in the touch display region.

Further, the shielding structure includes a metal shielding layer.

Further, there are multiple light emitting units, and the light emitting units are disposed at an interval; the touch panel further includes a pixel defining layer surrounding the multiple light emitting units, and an orthographic projection of the metal shielding layer on the substrate is located within a region of an orthographic projection of the pixel defining layer on the substrate.

Further, the orthographic projection of the metal shielding layer on the substrate is of a mesh structure, and an orthographic projection of one of the multiple light emitting units on the substrate is located within a mesh hole of the mesh structure.

Further, the touch panel further includes:
a first light absorbing film covering surfaces of the metal shielding layer, where an orthographic projection of the first light absorbing film on the substrate is located within the region of the orthographic projection of the pixel defining layer on the substrate.

Further, the touch panel further includes: a color film, where the color film includes multiple color resist blocks and a black matrix surrounding the multiple color resist blocks, the multiple color resist blocks correspond to the multiple light emitting units one to one, and the black matrix covers the metal shielding layer.

Further, the shielding structure further includes:
a transparent conductor layer on a side of the metal shielding layer facing away from the light emitting unit or between the metal shielding layer and the light emitting unit.

Further, the shielding structure includes a transparent conductor layer.

Further, the touch panel further includes:
a third inorganic packaging layer covering the light emitting unit; and
a second organic packaging layer on a side of the third inorganic packaging layer facing away from the substrate,
where the first inorganic packaging layer is on a side of the second organic packaging layer facing away from the substrate.

Further, the touch panel further includes:
a buffer layer on a surface of the shielding structure facing toward the substrate.

Further, the touch panel further includes:
a planarization layer on a surface of the shielding structure facing away from the substrate.

Further, an orthographic projection of the shielding structure on the substrate and an orthographic projection of the touch electrode on the substrate have an overlapping region.

Further, the light emitting unit includes a first electrode, a light emitting layer, and a second electrode that are stacked in layers, and the first electrode is located between the second electrode and the substrate; the touch panel further includes:
a first metal layer disposed on a same layer as the first electrode, where an orthographic projection of the first metal layer on the substrate and an orthographic projection of the second electrode on the substrate are disposed at an interval, and the shielding structure is electrically connected to the first metal layer through a first via hole.

Further, the light emitting unit includes a first electrode, a light emitting layer, and a second electrode that are stacked in layers, and the first electrode is located between the second electrode and the substrate;
the touch panel further includes: a bridging metal layer and a touch insulating layer, where the bridging metal layer is on a side of the shielding structure facing away from the substrate, the touch insulating layer is on a side of the bridging metal layer facing away from the substrate, and the touch electrode is on a side of the touch insulating layer facing away from the substrate;
the touch panel further includes: a second metal layer, where the second metal layer is disposed on a same layer as the bridging metal layer, and an orthographic projection of the second metal layer on the substrate and an orthographic projection of the second electrode on the substrate are disposed at an interval; the shielding structure is electrically connected to the second metal layer through a second via hole.

Further, there are multiple light emitting units, and the light emitting units are disposed at an interval; the touch panel further includes a pixel defining layer surrounding the multiple light emitting units, and orthographic projections of the metal shielding layer and the touch electrode on the substrate are located within a region of an orthographic projection of the pixel defining layer on the substrate;

the touch panel further includes a second light absorbing film, where the second light absorbing film covers the touch electrode, and an orthographic projection of the second light absorbing film on the substrate is located within the region of the orthographic projection of the pixel defining layer on the substrate.

According to an aspect of the present disclosure, there is provided a display device, including the touch panel described above.

In the touch panel and the display device according to the present disclosure, the shielding structure is located in the touch display region and between the light emitting unit and the touch electrode. With such configuration, a coupling capacitance between an electrode of the light emitting unit and the touch electrode can be reduced, so that signal interference between the electrode of the light emitting unit and the touch electrode is decreased, and a touch effect is improved.

Figure 1:
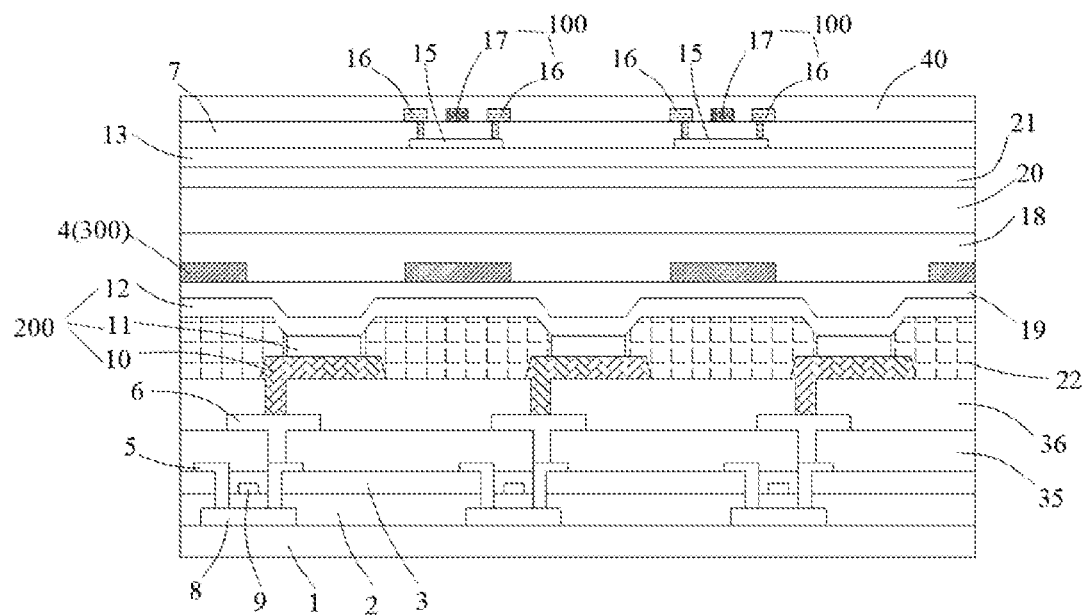
FIG. 1 is a schematic diagram of a touch panel according to an embodiment of the present disclosure.

Description of reference signs: 1. substrate; 2. gate insulating layer; 3. interlayer insulating layer; 4, metal shielding layer; 5. first source/drain electrode layer; 6. second source/drain electrode layer; 7. touch insulating layer; 8. active layer; 9. gate electrode layer; 10. first electrode; 11, light emitting layer; 12. second electrode; 13. touch buffer layer; 14. buffer layer; 15. bridging metal layer; 16. first touch electrode; 17. second touch electrode; 18. planarization layer; 19. first inorganic packaging layer; 20. first organic packaging layer; 21. second inorganic packaging layer; 22. pixel defining layer; 23. first light absorbing film; 24. color resist block; 25. black matrix; 26. transparent conductor layer; 27. second organic packaging layer; 28. third inorganic packaging layer; 30. first via hole; 31. first metal layer; 32. second metal layer; 33. second via hole; 34. third metal layer; 35. first planarization layer; 36. second planarization layer; 37. second light absorbing film; 38. touch lead; 39. touch chip; 40. touch protection layer; 100. touch electrode; 200, light emitting unit; 300. shielding structure; 500. color film; 600. touch display region; 700. peripheral region.

DETAILED DESCRIPTION

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses consistent with some aspects of the present disclosure as detailed in the appended claims.

The terms used in the present disclosure are for the purpose of describing particular embodiments only, and are not intended to limit the present disclosure. Unless otherwise defined, technical or scientific terms used in this disclosure should have ordinary meaning as understood by one of ordinary skill in the art to which the disclosure belongs. "First", "second" and similar words used in the specification and claims of the present disclosure do not represent any order, quantity or importance, but are used only to distinguish different components. Likewise, similar words such as "one", "a" or "an" do not represent a quantity limit, but represent that there is at least one. "Plurality", "multiple" or "several" means two or more. Unless otherwise indicated, similar words such as "front", "rear", "lower" and/or "upper" are only for convenience of description, and are not limited to one position or one spatial orientation. Similar words such as "including" or "comprising" mean that an element or an item appearing before "including" or "comprising" covers elements or items and their equivalents listed after "including" or "comprising", without excluding other elements or items. Similar words such as "connect" or "connected with each other" are not limited to physical or mechanical connections, and may include electrical connections, whether direct or indirect. Terms determined by "a/an", "the" and "said" in their singular forms in the present disclosure and the appended claims are also intended to include plural forms unless clearly indicated otherwise in the context. It should also be understood that the term "and/or" as used herein refers to and includes any or all possible combinations of one or more associated listed items.

In the related art, Flexible Multi-Layer On Cell (FMLOC) refers to a touch panel with a mutual capacitance touch device manufactured outside a thin film packaging layer of a display panel. FMLOC can integrate a display structure and a touch structure, and has advantages of being light, thin, foldable, etc., which can meet product requirements for flexible folding, narrow bezel and the like. Because a size of the display panel is increased, touch noise is increased. Especially, in FMLOC, a distance between a touch electrode and a cathode is shorter, so that a capacitor load is larger, and an intensity of touch noise received through load capacitance coupling is higher, which reduces a touch effect.

The embodiments of the present disclosure provide a touch panel. The touch panel may include a touch display region and a peripheral region. The peripheral region may surround the touch display region. As shown in FIG. 1, the touch panel may include a substrate 1, a light emitting unit 200, a first inorganic packaging layer 19, a first organic packaging layer 20, a second inorganic packaging layer 21, a shielding structure 300, and a touch electrode 100.

The light emitting unit 200 is disposed on a side of the substrate 1. The light emitting unit 200 is located in the touch display region. The first inorganic packaging layer 19 may be disposed on a side of the light emitting unit 200 facing away from the substrate 1. The shielding structure 300 is disposed on a side of the first inorganic packaging layer 19 facing away from the substrate 1. The shielding structure 300 is located in the touch display region. The first organic packaging layer 20 may be disposed on a side of the first inorganic packaging layer 19 facing away from the substrate 1. The second inorganic packaging layer 21 may be disposed on a side of the first organic packaging layer 20 facing away from the substrate 1. The touch electrode 100 is disposed on a side of the second inorganic packaging layer 21 facing away from the light emitting unit 200. The touch electrode 100 is located in the touch display region.

In the touch panel according to the embodiments of the present disclosure, the shielding structure 300 is located in the touch display region and between the light emitting unit 200 and the touch electrode 100. With such configuration, a coupling capacitance between an electrode of the light emitting unit 200 and the touch electrode 100 can be reduced, so that signal interference between the electrode of the light emitting unit 200 and the touch electrode 100 is decreased, an intensity of touch noise is lowered, and a touch effect is improved.

Each portion of the touch panel according to the embodiments of the present disclosure will be described in detail below.

As shown in FIG. 1, the substrate 1 may be a rigid substrate. The rigid substrate may be a glass substrate, a Polymethyl methacrylate (PMMA) substrate, or the like. Of course, the substrate 1 may be a flexible substrate. The flexible substrate may be a Polyethylene terephthalate (PET) substrate, a Polyethylene naphthalate two formic acid glycol ester (PEN) substrate, or a Polyimide (PI) substrate.

As shown in FIG. 1, the touch panel in the present disclosure may further include an active layer 8, a gate insulating layer 2, a gate electrode layer 9, an interlayer insulating layer 3, and a first source/drain electrode layer 5. The active layer 8 may be disposed on the substrate 1. The gate insulating layer 2 may be disposed on the substrate 1, and cover the active layer 8. The gate electrode layer 9 may be disposed on a side of the gate insulating layer 2 facing away from the substrate 1. The interlayer insulating layer 3 may be disposed on the gate insulating layer 2, and cover the gate electrode layer 9. The first source/drain electrode layer 5 may be disposed on the interlayer insulating layer 3, and a partial pattern of the first source/drain electrode layer 5 may be connected to the active layer 8 through a via hole passing through the interlayer insulating layer 3 and the gate insulating layer 2.

Figure 11:
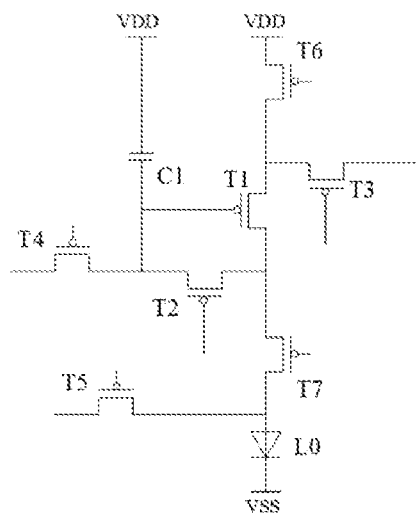
FIG. 11 is a schematic diagram of a pixel circuit according to an embodiment of the present disclosure.

As shown in FIG. 1, the touch panel according to the embodiments of the present disclosure may further include a first planarization layer 35 and a second source/drain electrode layer 6. The first planarization layer 35 covers the first source/drain electrode layer 5 and the interlayer insulating layer 3. The second source/drain electrode layer 6 may be disposed on the first planarization layer 35, and a partial pattern of the second source/drain electrode layer 6 may be electrically connected to the first source/drain electrode layer 5 through a via hole passing through the first planarization layer 35. The touch panel in the present disclosure may further include a second planarization layer 36. The second planarization layer 36 may cover the second source/drain electrode layer 6. The touch panel according to the embodiments of the present disclosure may include a pixel circuit. The active layer 8, the gate insulating layer 2, the gate electrode layer 9, the interlayer insulating layer 3, and the first source/drain electrode layer 5 may form a driving transistor. As shown in FIG. 11, the pixel circuit may be a 7T1C pixel circuit, which may include a driving transistor T1, a data writing transistor T3, a compensation transistor T2, a first light emitting control transistor T6, a second light emitting control transistor T7, a first reset transistor T4, a second reset transistor T5, and a storage capacitor C.

As shown in FIG. 1, the light emitting unit 200 is disposed on a side of the substrate 1. There may be multiple light emitting units 200, and the light emitting units 200 are disposed at an interval in a direction parallel to the substrate 1. The multiple light emitting units 200 may include red light emitting units, green light emitting units, and blue light emitting units. Each light emitting unit 200 may include a first electrode 10, a second electrode 12, and a light emitting layer 11. The light emitting layer 11 may be an organic electroluminescent layer, and of course, the light emitting layer 11 may be a quantum dot light emitting layer, which is not particularly limited in the embodiments of the present disclosure. The first electrode 10 may be an anode, and the second electrode 12 may be a cathode, which is not limited thereto in the present disclosure. The first electrode 10 may be disposed on a side of the second planarization layer 36 facing away from the substrate 1, the light emitting layer 11 may be disposed on a side of the first electrode 10 facing away from the substrate 1, and the second electrode 12 may be disposed on a side of the light emitting layer 11 facing away from the substrate 1. The first electrode 10 is electrically connected to the second source/drain electrode layer 6 through a via hole passing through the second planarization layer 36. The multiple light emitting units 200 may share one second electrode 12. As shown in FIG. 1, the touch panel in the present disclosure may further include a pixel defining layer 22. The pixel defining layer 22 may surround the multiple light emitting units 200. The pixel defining layer 22 covers the second planarization layer 36 and the first electrode 10, and the pixel defining layer 22 is provided with a pixel opening exposing the first electrode 10.

Figure 12:
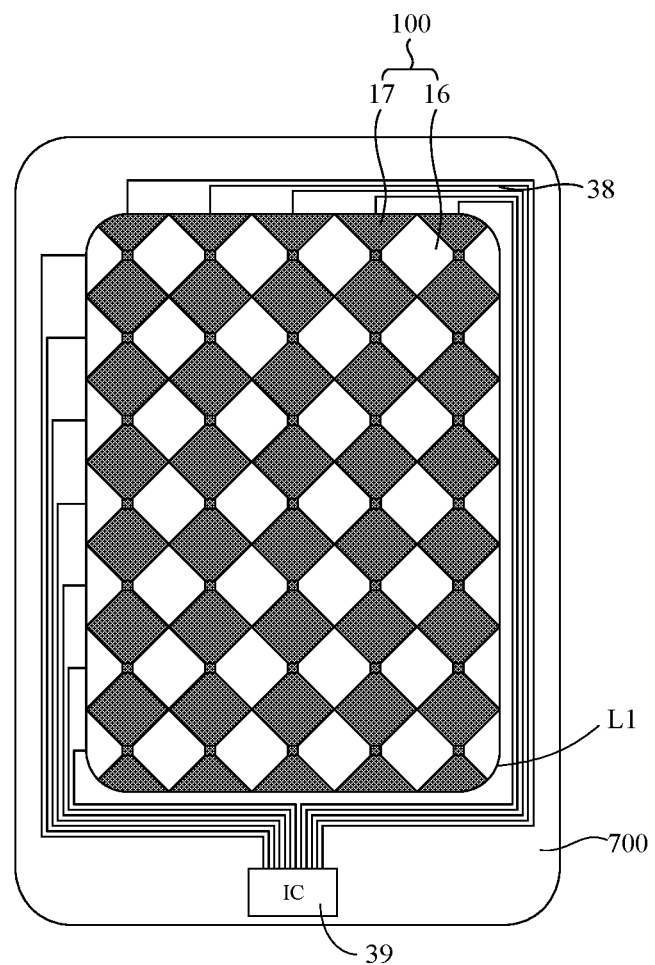
FIG. 12 is another schematic diagram of a touch panel according to an embodiment of the present disclosure.

The touch panel in the present disclosure may further include a touch structure. As shown in FIG. 1, the touch structure may include a touch buffer layer 13, a bridging metal layer 15, a touch insulating layer 7, a touch electrode 100, and a touch protection layer 40. The touch buffer layer 13 may be disposed on a side of the light emitting unit 200 facing away from the substrate 1. The bridging metal layer 15 may be disposed on a surface of the touch buffer layer 13 facing away from the substrate 1. The touch insulating layer 7 covers the bridging metal layer 15 and the touch buffer layer 13. The touch electrode 100 is disposed on a surface of the touch insulating layer 7 facing away from the substrate 1. As shown in FIG. 12, the touch electrode 100 may include first touch electrodes 16 and second touch electrodes 17 disposed to intersect each other. In a region where the first touch electrodes 16 intersect the second touch electrodes 17, the first touch electrodes 16 are connected through the bridging metal layer 15. One of the first touch electrode 16 and the second touch electrode 17 is a touch sensing electrode, and another one of the first touch electrode 16 and the second touch electrode 17 is a touch driving electrode. The first touch electrodes 16 and the second touch electrodes 17 are of a metal mesh structure. In FIG. 12, a region surrounded by a line L1 is a touch display region 600 (see FIG. 7). A peripheral region 700 of the touch panel may be provided with a touch chip 39 and touch leads 38 connecting the touch chip 39 and the touch electrode 100. As shown in FIG. 1, the touch protection layer 40 may cover the touch electrode 100 and the touch insulation layer 7. The touch protection layer 40 may form a microlens unit, and the microlens unit may be disposed on a light emitting side of the light emitting unit 200 to improve light emitting efficiency. In addition, in order to avoid affecting a display effect, an orthographic projection of the touch electrode 100 on the substrate 1 may be located within a region of an orthographic projection of the pixel defining layer 22 on the substrate 1.

As shown in FIG. 1, the shielding structure 300 may be disposed between the light emitting unit 200 and the touch electrode 100, and is located in the touch display region. With such configuration, a coupling capacitance between the second electrode 12 of the light emitting unit 200 and the touch electrode 100 can be reduced, so that signal interference between the second electrode 12 of the light emitting unit 200 and the touch electrode 100 is decreased. An orthographic projection of the shielding structure 300 on the substrate 1 and an orthographic projection of the touch electrode 100 on the substrate 1 have an overlapping region, and the overlapping region is located within a region of an orthographic projection of the second electrode 12 on the substrate 1.

As shown in FIG. 1, the shielding structure 300 may be disposed on a surface of the first inorganic packaging layer 19 facing away from the substrate 1. The shielding structure 300 may include a metal shielding layer 4. The metal shielding layer 4 may be disposed on a surface of the first inorganic packaging layer 19 facing away from the substrate 1. Materials for the metal shielding layer 4 may be Mo, Ti, Ti/Al/Ti, Cu, etc. An orthographic projection of the metal shielding layer 4 on the substrate 1 may be located within a region of an orthographic projection of the pixel defining layer 22 on the substrate 1. With such configuration, light emitted from the light emitting unit 200 can be prevented from being shielded by the metal shielding layer 4. Further, the orthographic projection of the metal shielding layer 4 on the substrate 1 may be of a mesh structure. An orthographic projection of the light emitting unit 200 on the substrate 1 is located within a mesh hole of the mesh structure. For example, an orthographic projection of only one light emitting unit 200 is disposed in one mesh hole of the mesh structure. A function of the first inorganic packaging layer 19 is to block water and oxygen, and the first inorganic packaging layer 19 is made of an inorganic material, which may be specifically selected from $SiN_x$, $SiO_2$, SiC, $Al_2O_3$, ZnS, ZnO, and other materials having a function of blocking water and oxygen. A specific technology for forming the first inorganic packaging layer 19 may be selected from chemical vapor deposition (CVD), magnetron sputtering, atomic layer deposition (ALD), etc. Materials for the second inorganic packaging layer 21 may be the same as the materials for the first inorganic packaging layer 19. The first organic packaging layer 20 is made of an organic material, which may be specifically selected from acrylic resin, epoxy resin, etc., and a function of the first organic packaging layer 20 is to perform stress release and planarization.

Figure 2:
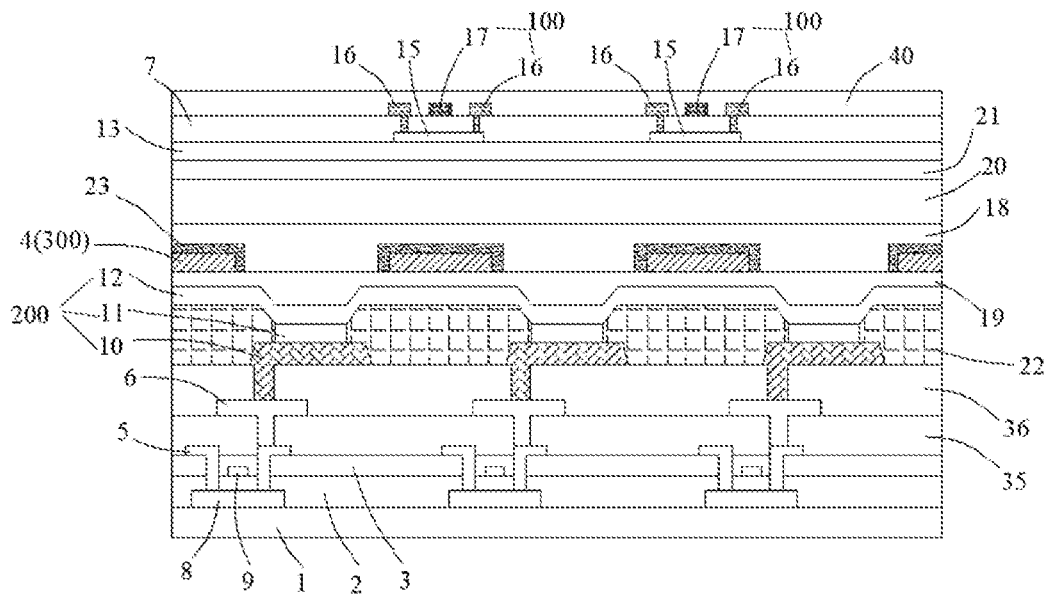
FIG. 2 is a schematic diagram of a touch panel having a first light absorbing film according to an embodiment of the present disclosure.

As shown in FIG. 2, the touch panel in the present disclosure may further include a first light absorbing film 23. The first light absorbing film 23 may cover surfaces of the metal shielding layer 4. Specifically, the first light absorbing film 23 may cover a top surface and side surfaces of the metal shielding layer 4, that is, the metal shielding layer 4 is wrapped between the first light absorbing film 23 and the first inorganic packaging layer 19. With such configuration, the metal shielding layer 4 can be avoided from reflecting external light, which prevents a display effect from being affected. The top surface of the metal shielding layer 4 is a surface of the metal shielding layer 4 facing away from the substrate 1. In addition, an orthographic projection of the first light absorbing film 23 on the substrate 1 may be located within the region of the orthographic projection of the pixel defining layer 22 on the substrate 1. With such configuration, the first light absorbing film 23 can be prevented from affecting the light emitted from the light emitting unit 200. A material for the first light absorbing film 23 may be black ink.

Figure 3:
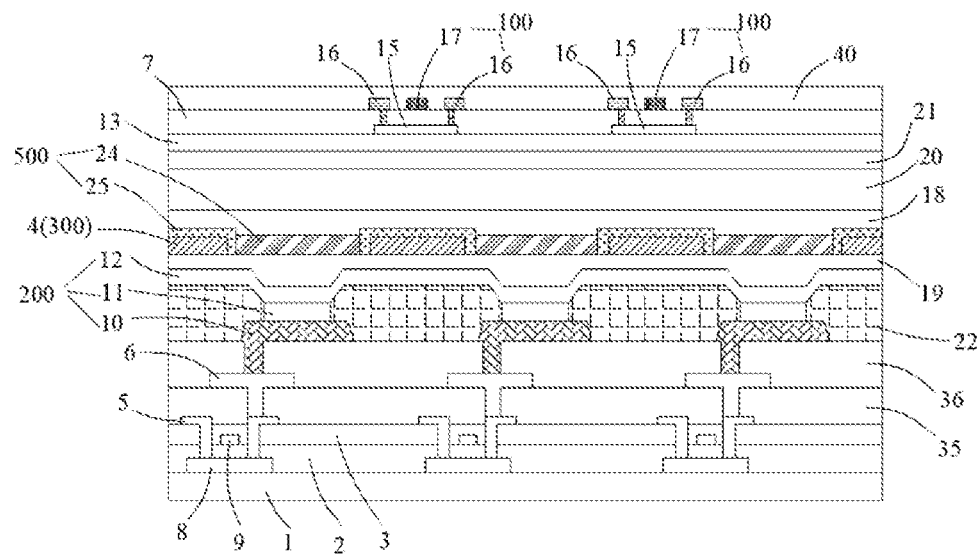
FIG. 3 is a schematic diagram of a touch panel having a color film according to an embodiment of the present disclosure.

As shown in FIG. 3, the touch panel in the present disclosure may further include a color film 500. The color film 500 may be disposed on a surface of the first inorganic packaging layer 19 facing away from the substrate 1. The color film 500 may include multiple color resist blocks 24 and a black matrix 25 surrounding the multiple color resist blocks 24. The multiple color resist blocks 24 correspond to the multiple light emitting units 200 one to one, and the black matrix 25 may cover the metal shielding layer 4. Specifically, the black matrix 25 may cover the top surface and the side surfaces of the metal shielding layer 4, that is, the metal shielding layer 4 is wrapped between the black matrix 25 and the first inorganic packaging layer 19. In the present disclosure, a polarizer is replaced with the color film 500, which reduces a thickness of a module, and at the same time, the color film 500 is located between the touch electrode 100 and the second electrode 12, which increases a distance between the touch electrode 100 and the second electrode 12, and can reduce a load capacitance formed on the touch electrode 100.

Figure 4:
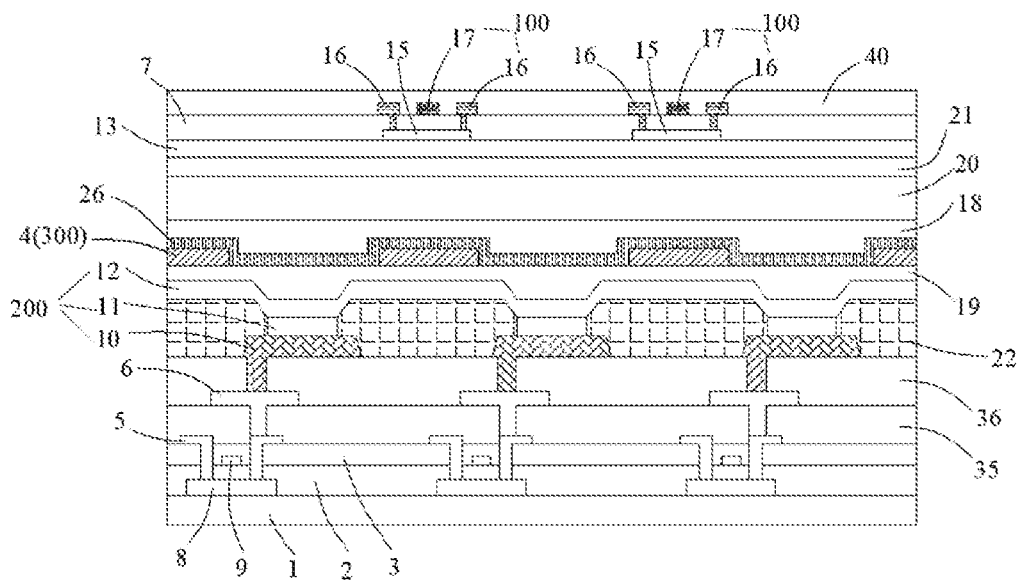
FIG. 4 is a schematic diagram of a touch panel having a transparent conductor layer according to an embodiment of the present disclosure.

As shown in FIG. 4, the shielding structure 300 in the present disclosure may include a transparent conductor layer 26. The transparent conductor layer 26 may be disposed on a side of the metal shielding layer 4 facing away from the light emitting unit 200. Specifically, the transparent conductor layer 26 may cover the metal shielding layer 4 and the first inorganic packaging layer 19. Taking the surfaces of the metal shielding layer 4 being covered with the first light absorbing film 23 as an example, the transparent conductor layer 26 may cover the first light absorbing film 23. Of course, the transparent conductor layer 26 may be disposed between the metal shielding layer 4 and the light emitting unit 200. In the present disclosure, the transparent conductor layer 26 is disposed on a side of the metal shielding layer 4, so that a resistance of the metal shielding layer 4 can be reduced to improve a shielding effect, and at the same time, the disposed transparent conductor layer 26 will not shield the light emitted from the light emitting unit 200. In other embodiments of the present disclosure, the shielding structure 300 may include only the transparent conductor layer 26. and the transparent conductor layer 26 is disposed on the first inorganic packaging layer 19. It should be noted that the transparent conductor layer 26 may be of a whole surface structure.

Figure 5:
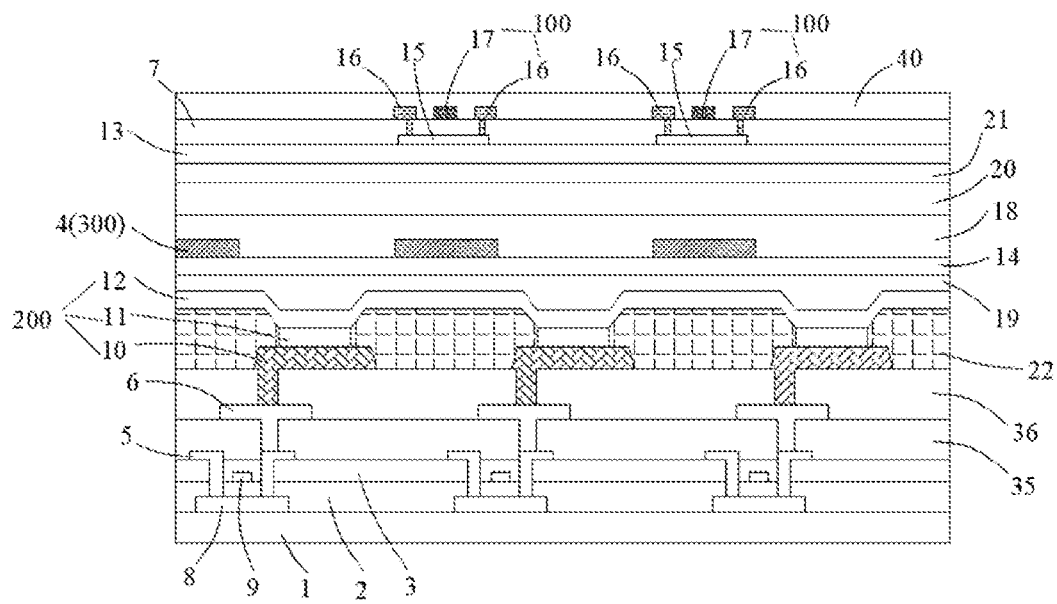
FIGS. 5 and 6 are schematic diagrams of a touch panel having a buffer layer according to an embodiment of the present disclosure.

As shown in FIG. 5, in order to avoid damage to the first inorganic packaging layer 19 in the process of forming the shielding structure 300, the touch panel in the present disclosure may further include a buffer layer 14, and the buffer layer 14 may be disposed between the first inorganic packaging layer 19 and the shielding structure 300, that is, the buffer layer 14 may be disposed on a surface of the shielding structure 300 facing toward the substrate 1. With such configuration, the damage to the first inorganic packaging layer 19 in the process of forming the shielding structure 300 can be reduced, so as to solve a problem of water and oxygen erosion caused by the damage to the first inorganic packaging layer 19. In addition, in order to conveniently form the first organic packaging layer 20 on the shielding structure 300, the touch panel in the present disclosure may further include a planarization layer 18 covering the shielding structure 300. The planarization layer 18 may be disposed on a surface of the shielding structure 300 facing away from the substrate 1, and the first organic packaging layer 20 is disposed on the planarization layer 18. In addition, the touch structure may be disposed on a side of the second inorganic packaging layer 21 facing away from the substrate 1.

Figure 6:
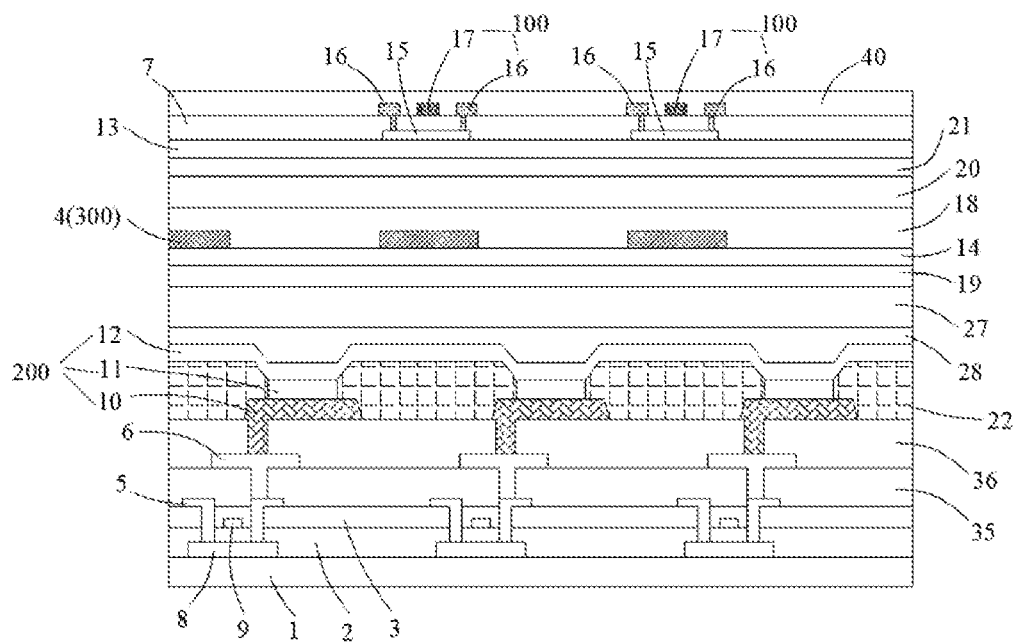

Further, as shown in FIG. 6, the touch panel in the present disclosure may further include a second organic packaging layer 27 and a third inorganic packaging layer 28. The third inorganic packaging layer 28 may cover the light emitting unit 200, and the second organic packaging layer 27 may be disposed on a side of the third inorganic packaging layer 28 facing away from the substrate 1. The first inorganic packaging layer 19 may be disposed on a side of the second organic packaging layer 27 facing away from the substrate 1. Materials for the third inorganic packaging layer 28 may be the same as the materials for the first inorganic packaging layer 19. Materials for the second organic packaging layer 27 may be the same as the materials for the first organic packaging layer 20.

Figure 7:
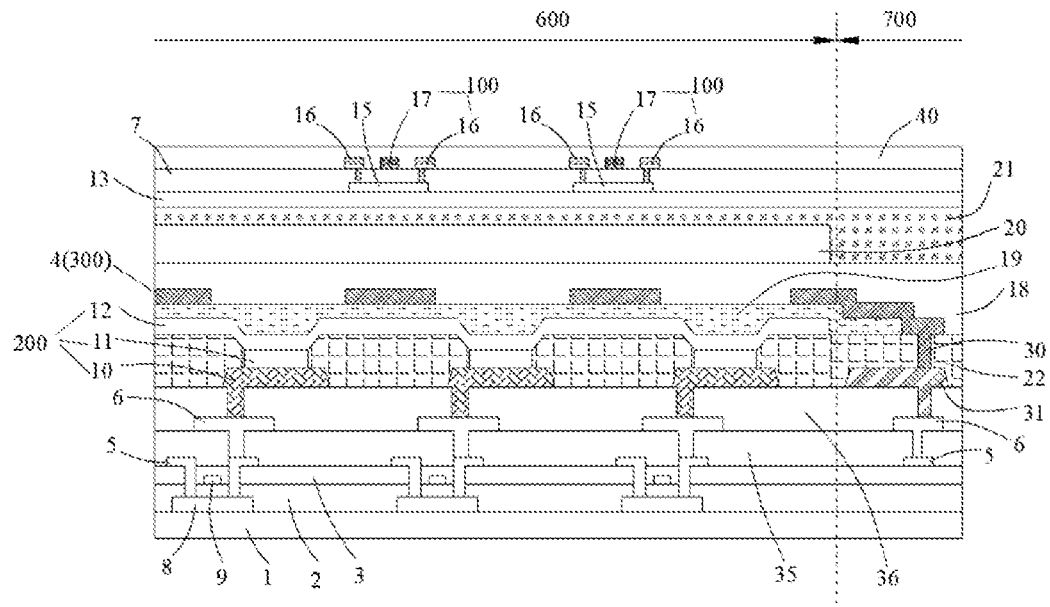
FIGS. 7 and 8 are schematic diagrams of a touch panel having a first metal layer according to an embodiment of the present disclosure.
Figure 8:
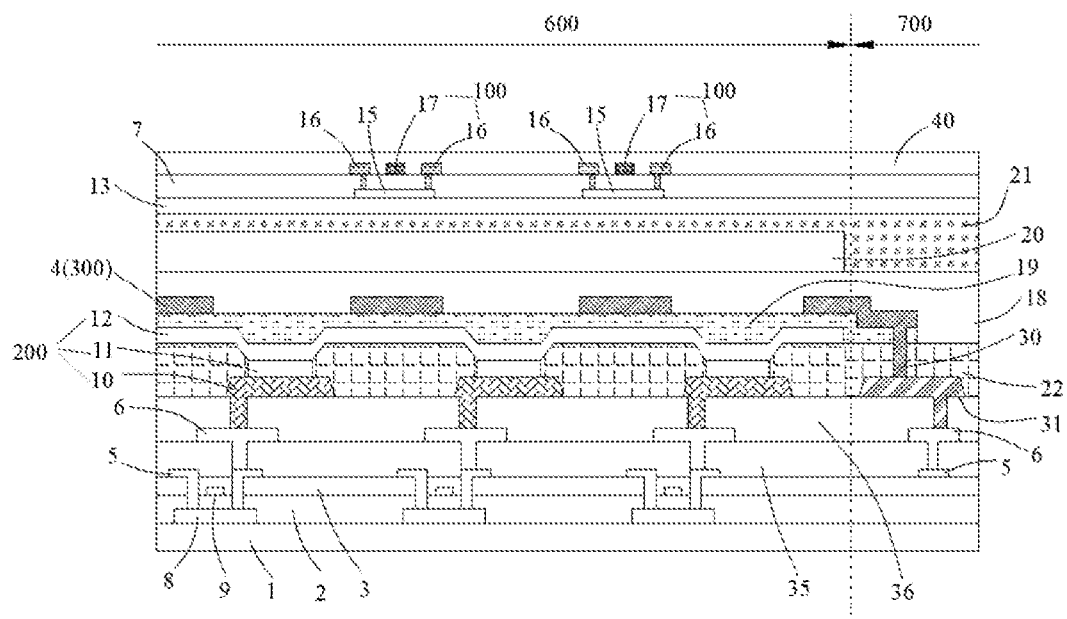

As shown in FIGS. 7 and 8, the touch panel in the present disclosure may further include a first metal layer 31. The first metal layer 31 may be disposed on the same layer as the first electrode 10, and an orthographic projection of the first metal layer 31 on the substrate 1 and an orthographic projection of the second electrode 12 on the substrate 1 may be disposed at an interval. The shielding structure 300 may be electrically connected to the first metal layer 31 through a first via hole 30. With such configuration, a resistance of the shielding structure 300 may be reduced to improve a shielding effect. As shown in FIG. 7, an orthographic projection of the first via hole 30 on the substrate 1 and the first inorganic packaging layer 19 may be disposed at an interval. Of course, as shown in FIG. 8, the first via hole 30 may penetrate the first inorganic packaging layer 19. In addition, the first metal layer 31 may be electrically connected to the second source/drain electrode layer 6 and the first source/drain electrode layer 5, which is not limited thereto in the present disclosure. In addition, the first metal layer 31 may be located in the peripheral region 700, that is, the touch display region 600 and the first metal layer 31 are disposed at an interval, which is not particularly limited in the embodiments of the present disclosure.

Figure 9:
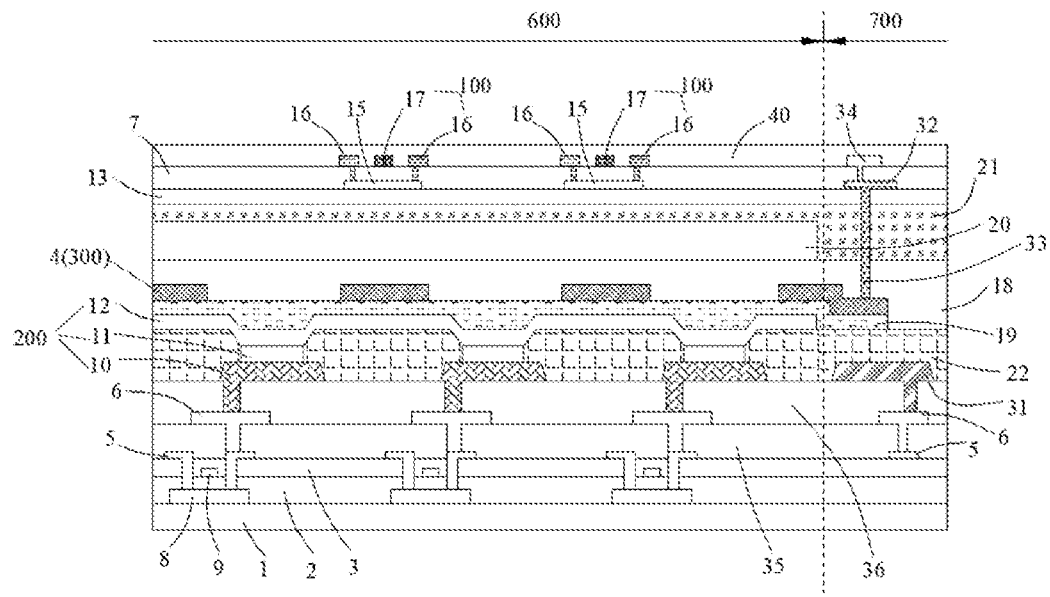
FIG. 9 is a schematic diagram of a touch panel having a second metal layer according to an embodiment of the present disclosure.

As shown in FIG. 9, the touch panel in the present disclosure may further include a second metal layer 32. The second metal layer 32 may be disposed on the same layer as the bridging metal layer 15, and an orthographic projection of the second metal layer 32 on the substrate 1 and an orthographic projection of the second electrode 12 on the substrate 1 are disposed at an interval. The shielding structure 300 may be electrically connected to the second metal layer 32 through a second via hole 33. With such configuration, a resistance of the shielding structure 300 may be reduced to improve a shielding effect. In addition, the touch panel in the present disclosure may further include a third metal layer 34. The third metal layer 34 may be disposed on the same layer as the touch electrode 100. The second metal layer 32 may be electrically connected to the third metal layer 34. With such configuration, a resistance of the shielding structure 300 may be further reduced to improve a shielding effect. In addition, the second metal layer 32 and the third metal layer 34 may be located in the peripheral region 700, that is, the touch display region 600 and the second metal layer 32 are disposed at an interval, and the touch display region 600 and the third metal layer 34 are disposed at an interval, which is not particularly limited in the embodiments of the present disclosure.

Figure 10:
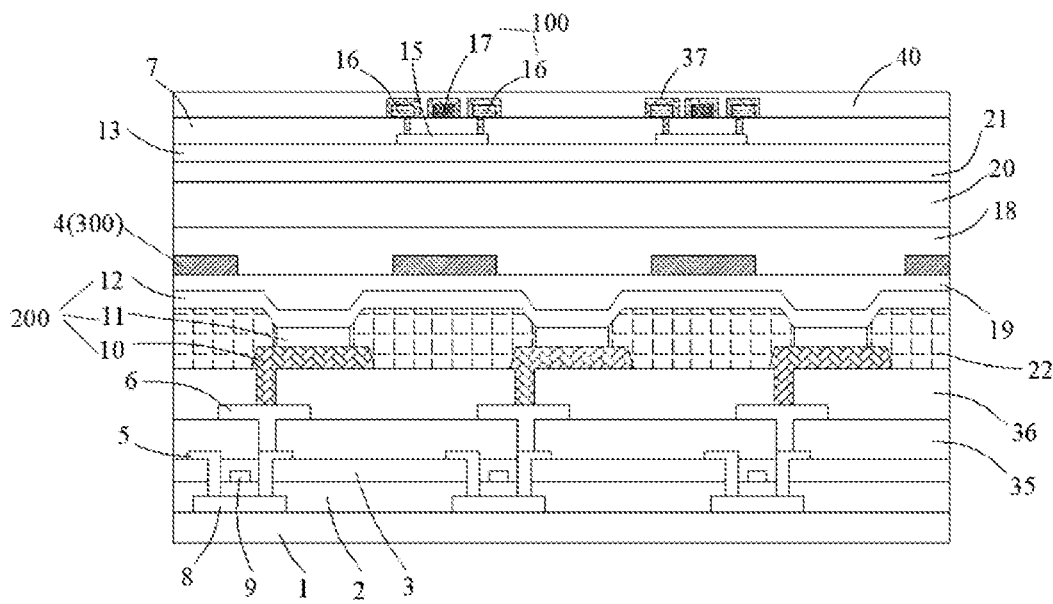
FIG. 10 is a schematic diagram of a touch panel having a second light absorbing film according to an embodiment of the present disclosure.

As shown in FIG. 10, the touch panel in the present disclosure may further include a second light absorbing film 37. The second light absorbing film 37 covers the touch electrode 100, that is, the touch electrode 100 is wrapped between the second light absorbing film 37 and the touch insulating layer 7. With such configuration, light reflected from the shielding structure 300) can be absorbed through the second light absorbing film 37, which can avoid a display effect from being affected. An orthographic projection of the second light absorbing film 37 on the substrate 1 is located within the region of the orthographic projection of the pixel defining layer 22 on the substrate 1. The orthographic projection of the second light absorbing film 37 on the substrate 1 and the orthographic projection of the metal shielding layer 4 on the substrate 1 may have an overlapping region.

The embodiments of the present disclosure provide a display device. The display device may include a touch panel according to any one of the above embodiments. The display device may be a mobile phone. Of course, the display device may be a tablet computer, a television, or the like. Since the touch panel in the display device in the embodiments of the present disclosure is the same as the touch panel in the touch panel embodiments, they have the same beneficial effects, which will not be repeated here.

The above are only preferred embodiments of the present disclosure, which are not intended to make any formal limitation on the disclosure. Although the present disclosure has been disclosed as above in the preferred embodiments, these preferred embodiments are not intended to limit the present disclosure, and any person skilled in the art, without departing from the scope of the technical solutions of the present disclosure, can make some changes or modifications to the technical contents disclosed above as equivalent embodiments with equivalent changes. However, without departing from the contents of the technical solutions of the present disclosure, any simple revisions, equivalent changes and modifications made to the above embodiments based on the technical essence of the present disclosure still fall within the scope of the technical solutions of the present disclosure.

The invention claimed is:

1. A touch panel, comprising: a touch display region and a peripheral region surrounding the touch display region, wherein the touch panel comprises:
    a substrate;
    a light emitting unit on a side of the substrate and in the touch display region;
    a first inorganic packaging layer on a side of the light emitting unit facing away from the substrate;
    a shielding structure on a side of the first inorganic packaging layer facing away from the substrate and in the touch display region;
    a first organic packaging layer on a side of the shielding structure facing away from the substrate;
    a second inorganic packaging layer on a side of the first organic packaging layer facing away from the substrate;

a touch electrode on a side of the second inorganic packaging layer facing away from the light emitting unit and in the touch display region,
wherein the touch panel further comprises a planarization layer on a surface of the shielding structure facing away from the substrate.

2. The touch panel according to claim 1, wherein the shielding structure comprises a metal shielding layer.

3. The touch panel according to claim 2, wherein there are multiple light emitting units, and the light emitting units are disposed at an interval; the touch panel further comprises a pixel defining layer surrounding the multiple light emitting units, and an orthographic projection of the metal shielding layer on the substrate is located within a region of an orthographic projection of the pixel defining layer on the substrate.

4. The touch panel according to claim 3, wherein the orthographic projection of the metal shielding layer on the substrate is of a mesh structure, and an orthographic projection of one of the multiple light emitting units on the substrate is located within a mesh hole of the mesh structure.

5. The touch panel according to claim 3, further comprising:
a first light absorbing film covering surfaces of the metal shielding layer, wherein an orthographic projection of the first light absorbing film on the substrate is located within the region of the orthographic projection of the pixel defining layer on the substrate.

6. The touch panel according to claim 3, further comprising: a color film, wherein the color film comprises multiple color resist blocks and a black matrix surrounding the multiple color resist blocks, the multiple color resist blocks respectively correspond to the multiple light emitting units, and the black matrix covers the metal shielding layer.

7. The touch panel according to claim 2, wherein the shielding structure further comprises:
a transparent conductor layer on a side of the metal shielding layer facing away from the light emitting unit or between the metal shielding layer and the light emitting unit.

8. The touch panel according to claim 7, wherein the metal shielding layer includes Mo, Ti, Ti/Al/Ti, or Cu.

9. The touch panel according to claim 2, wherein there are multiple light emitting units, and the light emitting units are disposed at an interval; the touch panel further comprises a pixel defining layer surrounding the multiple light emitting units, and orthographic projections of the metal shielding layer and the touch electrode on the substrate are located within a region of an orthographic projection of the pixel defining layer on the substrate;
the touch panel further comprises a second light absorbing film, wherein the second light absorbing film covers the touch electrode, and an orthographic projection of the second light absorbing film on the substrate is located within the region of the orthographic projection of the pixel defining layer on the substrate.

10. The touch panel according to claim 1, wherein the shielding structure comprises a transparent conductor layer.

11. The touch panel according to claim 1, further comprising:
a third inorganic packaging layer covering the light emitting unit; and
a second organic packaging layer on a side of the third inorganic packaging layer facing away from the substrate,
wherein the first inorganic packaging layer is on a side of the second organic packaging layer facing away from the substrate.

12. The touch panel according to claim 11, wherein materials for the third inorganic packaging layer are identical to materials for the first inorganic packaging layer, and materials for the second organic packaging layer are identical to materials for the first organic packaging layer.

13. The touch panel according to claim 1, further comprising:
a buffer layer on a surface of the shielding structure facing toward the substrate.

14. The touch panel according to claim 1, wherein an orthographic projection of the shielding structure on the substrate and an orthographic projection of the touch electrode on the substrate have an overlapping region.

15. The touch panel according to claim 1, wherein the light emitting unit comprises a first electrode, a light emitting layer, and a second electrode that are stacked in layers, and the first electrode is located between the second electrode and the substrate; the touch panel further comprises:
a first metal layer disposed on a same layer as the first electrode, wherein an orthographic projection of the first metal layer on the substrate and an orthographic projection of the second electrode on the substrate are disposed at an interval, and the shielding structure is electrically connected to the first metal layer through a first via hole.

16. The touch panel according to claim 1, wherein the light emitting unit comprises a first electrode, a light emitting layer, and a second electrode that are stacked in layers, and the first electrode is located between the second electrode and the substrate;
the touch panel further comprises: a bridging metal layer and a touch insulating layer, wherein the bridging metal layer is on a side of the shielding structure facing away from the substrate, the touch insulating layer is on a side of the bridging metal layer facing away from the substrate, and the touch electrode is on a side of the touch insulating layer facing away from the substrate;
the touch panel further comprises: a second metal layer, wherein the second metal layer is disposed on a same layer as the bridging metal layer, and an orthographic projection of the second metal layer on the substrate and an orthographic projection of the second electrode on the substrate are disposed at an interval; the shielding structure is electrically connected to the second metal layer through a second via hole.

17. The touch panel according to claim 16, further comprising a third metal layer, wherein the third metal layer is on a same layer as the touch electrode, and the second metal layer is electrically connected to the third metal layer.

18. A display device, comprising a touch panel which comprises a touch display region and a peripheral region surrounding the touch display region, wherein the touch panel further comprises:
a substrate;
a light emitting unit on a side of the substrate and in the touch display region;
a first inorganic packaging layer on a side of the light emitting unit facing away from the substrate;
a shielding structure on a side of the first inorganic packaging layer facing away from the substrate and in the touch display region;
a first organic packaging layer on a side of the shielding structure facing away from the substrate;

a second inorganic packaging layer on a side of the first organic packaging layer facing away from the substrate;

a touch electrode on a side of the second inorganic packaging layer facing away from the light emitting unit and in the touch display region, wherein the touch panel further comprises a planarization layer on a surface of the shielding structure facing away from the substrate.

19. The display device according to claim 18, wherein the shielding structure comprises a metal shielding layer.

20. The display device according to claim 19, wherein there are multiple light emitting units, and the light emitting units are disposed at an interval; the touch panel further comprises a pixel defining layer surrounding the multiple light emitting units, and an orthographic projection of the metal shielding layer on the substrate is located within a region of an orthographic projection of the pixel defining layer on the substrate.

* * * * *